३,४६७,६४९
Patented Sept. 16, 1969

3,467,649
PURIFYING ESSENTIAL OIL OF
ARTEMISIA PONTICA L.
Gian Mario Nano and Paolo Cabella, Turin, Italy, assignors to Collins Chemical Co., Inc., New York, N.Y.
No Drawing. Filed Mar. 27, 1967, Ser. No. 625,941
Int. Cl. C07g *17/00;* C11b *9/02*
U.S. Cl. 260—236.6                                2 Claims

ABSTRACT OF THE DISCLOSURE

The invention provides a method of selectively removing α-thujone (without a simultaneous removal of isoartemisia-ketone) from an essential oil of *Artemisia pontica* L. by reaction with Girard D.-reagent under specific conditions, followed by phase-splitting and solvent extraction.

---

Hydroalcoholic extracts of *Artemisia pontica* L. are currently employed in preparing drinks and foodstuffs generally, more particularly candies and vermouth.

An essential oil can moreover be obtained from said plant, which is yellow or yellow-reddish in color and has a peculiar rather pleasant and fragrant smell. The oil possesses organoleptic properties which make *Artemisia pontica* L. a valuable rawstuff for the vermouth industry.

A high-grade essential oil of *Artemisia pontica* is of a density $d_{23}^{20} = 0.8976$ and has a refraction index $n_D^{19.5} =$ 1.4759; it can be analyzed by gas-chromatography by employing a 2 meter column filled with Carbowax 1500, and operating at 140° C. with a helium stream of about three liters/hour. The main components of the oil are found to be: isoartemisia-ketone, α-thujone, 1,8-cineol, α-terpineol, estragole, isoartemisia-alcohol and (with oils obtained from fresh plants only) hydrocarbons and polyacetylenic oxides. The peculiar aroma imparted to vermouth by an infusion of *Artemisia pontica* L. is mainly due to the isoartemisia-ketone which represents about 40–50% B.W. of the essential oil of the plant; this ketone is very rare in nature and could not heretofore be prepared by synthesis.

Unfortunately, however, said essential oil contains appreciable quantities of α-thujone, from about 25% to about 35% B.W.; on the other hand, a number of legislations impose a substantial limitation on the contents of this ketone in alcoholic drinks, so that the essential oil of *Artemisia pontica* L. cannot be directly employed as such in preparing vermouth.

The problem therefore arises of removing α-thujone from said essential oil. The problem could not be solved heretofore because both above mentioned ketones, namely, isoartemisia-ketone and α-thujone, are actually of the same reactivity towards the reagents (sodium bisulphite, hydroxylamine, semicarbazide, Girard's reagents) which are currently employed for isolating ketones; consequently, the precipitation of α-thujone by means of these reagents in accordance with the prior technique implies a precipitation of large proportions of the isoartemisia-ketone contained in the oil, so that the oil left by precipitation is actually useless for the purposes referred to above.

It has now been found that by operating in a particular manner the α-thujone can be removed from the essential oil, of *Artemisia pontica* L. in a selective manner by employing Girard D.-reagent (N,N'-dimethylglycinylhydrazide hydrochloride).

More particularly, according to the invention, a mixture of:

(a) one part B.W. of essential oil of *Artemisia pontica* L.,
(b) at least 5 parts B.W. of an alcoholic solvent for said oil, of a boiling point below 100° C. (preferably methanol),
(c) ⅔ up to 1 part B.W. of Girard D.-reagent, is refluxed at substantially atmospheric pressure during 2 to 4 hours. Under these conditions the reagent preferentially reacts with the α-thujone to form the corresponding N,N'-dimethylglycinylhydrazone, which is soluble both in the reaction mixture, in water as well as in water-alcohol mixtures. (It should be noted that with reaction periods shorter than 2 hours there is a substantial risk of not fully eliminating the α-thujone, whereas periods exceeding 4 hours easily result in baking of the oil). On completion of reaction the mixture is diluted with a water volume amounting to at least twice the volume of the alcoholic solvent employed. Two phases are thereby formed: a heavy, aqueous-alcoholic phase having dissolved therein the excess reagent and almost all the thujone-N,N'-dimethyl-glycinyl-hydrazone, and a light, oily phase free from α-thujone, the valuable components of which are hardly or not at all soluble in the aqueous-alcoholic phase present.

This heterogeneous mixture is then extracted by means of a low-boiling (B.P. below about 70° C.) organic solvent which is not miscible with the aqueous-alcoholic phase and of a smell (if any) such as to leave the organoleptic properties of the oily phase unaffected. The preferred solvent is pentane; further typical solvents for the purposes of this process are hexane and ethyl ether. Extraction is advantageously carried out twice or three times, with small quantities of solvent at a time. The oily phase is thereby actually fully recovered.

The individual extracts are brought together and the solvent therein contained is evaporated, no reduced pressure being necessary; the residue is an oil totally free from α-thujone, in which the valuable organoleptic properties of the starting oil are maintained.

The proportions of the reagent in the instant process are critical in the sense that larger proportions than herein indicated in paragraph (c) result in loss of the isoartemisia-ketone, whereas proportions below the range indicated above are insufficient to fully remove the α-thujone present in the starting oil. Of course, within the indicated range larger proportions of the reagent correspond to relatively high thujone contents and vice versa.

EXAMPLE

The starting material is an essential oil of *Artemisia pontica* L. of the following properties:

density $d_{23}^{20} = 0.8976$
refraction index $n_D^{19.5} = 1.4759$.

Its gas-chromatographic analysis carried out under the hereinbefore indicated conditions, is as follows

| Component | Percent B.W. | Retention time |
|---|---|---|
| Cineol | 20.1 | 5 min., 5 sec. |
| Isoartemisia-ketone | 43.3 | 11 min. |
| α-Thujone | 27.6 | 16 min., 35 sec. |
| Estragole | 3.68 | 44 min. |
| Secondary components | 5.05 | |

10 grams of this oil are placed into a 250 ml. flask and admixed with 10 g. Girard D.-reagent and 100 g. anhydrous methanol. The solution thus obtained becomes clear on heating.

A reflux cooler is fitted to the flask and the content is refluxed during 2 hours while the flask is heated on a water-bath. The reaction mixture is subsequently allowed to cool, poured into 300 ml. water and extracted twice by means of 50 g. pentane at a time.

The extracts are brought together and distilled at room pressure till full removal of the pentane. This leaves an oil which is excellent for the purposes considered herein. The gas-chromatographic analysis carried out under the abovementioned conditions denotes the absence of the peak corresponding to the α-thujone (retention time 16 min. 35 sec.).

What we claim is:

1. Method of selectively removing α-thujone from *Artemisia pontica* L. essential oil comprising a substantial amount of said thujone together with isoartemisia-ketone, said method comprising: refluxing for a period of 2 to 4 hours a liquid mixture consisting of:
   (a) one part by weight said essential oil,
   (b) at least 5 parts by weight of an alcoholic solvent for said oil, having B.P. less than 100° C.,
   (c) ⅔ to 1 part by weight of N,N'-dimethyl-glycinyl-hydrazide hydrochloride; diluting the reaction mixture with a volume of water amounting to at least twice the volume of the alcoholic solvent (c) thereby splitting the mixture into a two-phase system comprising an oily phase substantially free of the thujone and a water-alcoholic phase; extracting the mixture with a low-boiling organic solvent for said oily phase immiscible with the water-alcoholic phase which low-boiling organic solvent is selected from the group consisting of pentane, hexane and diethyl ether, to obtain an extract containing substantially all the oily phase; and removing the organic solvent from the extract by evaporation thereby to recover the thujone-free oily phase.

2. The method of claim 1, wherein the alcoholic solvent is methanol.

References Cited

UNITED STATES PATENTS 3,294,550   12/1966   Ikeda et al. _____ 260—236.6

JAMES A. PATTEN, Primary Examiner

U.S. Cl. X.R.

99—140; 260—587